United States Patent [19]

Shimada et al.

[11] Patent Number: 5,426,523
[45] Date of Patent: Jun. 20, 1995

[54] LIQUID CRYSTAL DISPLAY HAVING A LIGHT BLOCKING FILM ON STEPPED PORTIONS

[75] Inventors: Takayuki Shimada; Koujiro Tsubota, both of Nara; Yasuhiro Matsushima, Kashihara, all of Japan

[73] Assignee: Sharp Kabushiki Kaisha, Japan

[21] Appl. No.: 58,715

[22] Filed: May 10, 1993

[30] Foreign Application Priority Data

May 13, 1992 [JP] Japan .................. 4-120846

[51] Int. Cl.$^6$ .................. G02F 1/1343; G02F 1/1335
[52] U.S. Cl. .................. 359/54; 359/59; 359/67; 359/87
[58] Field of Search .................. 359/59, 67, 87, 54, 359/58

[56] References Cited

U.S. PATENT DOCUMENTS

| | | | |
|---|---|---|---|
| 4,804,953 | 2/1989 | Castleberry | 359/59 |
| 5,162,933 | 11/1992 | Kakuda et al. | 359/87 |
| 5,307,189 | 4/1994 | Nishiki et al. | 359/67 |

FOREIGN PATENT DOCUMENTS

| | | | |
|---|---|---|---|
| 58-159516 | 9/1983 | Japan | 359/67 |
| 63-56626 | 3/1988 | Japan | 359/67 |
| 93007528 | 4/1993 | WIPO | 359/54 |

*Primary Examiner*—Anita Pellman Gross
*Assistant Examiner*—Ron Trice
*Attorney, Agent, or Firm*—Nixon & Vanderhye

[57] ABSTRACT

An active matrix substrate is disclosed. The active matrix substrate of the invention includes: a plurality of scanning lines; a plurality of signal lines which cross the plurality of scanning lines; a plurality of picture element electrodes formed in regions defined by the plurality of scanning lines and the plurality of signal lines, respectively, part of each of the plurality of picture element electrodes overlapping at least one of the scanning lines and the signal lines adjacent to the picture element electrode; and a light blocking film covering the line.

13 Claims, 8 Drawing Sheets

LIQUID CRYSTAL DISPLAY HAVING A LIGHT BLOCKING FILM ON STEPPED PORTIONS

BACKGROUND OF THE INVENTION

1. Field of the Invention

The present invention relates to an active matrix substrate which constitutes a liquid crystal display apparatus or the like.

2. Description of the Related Art

Figure 6:
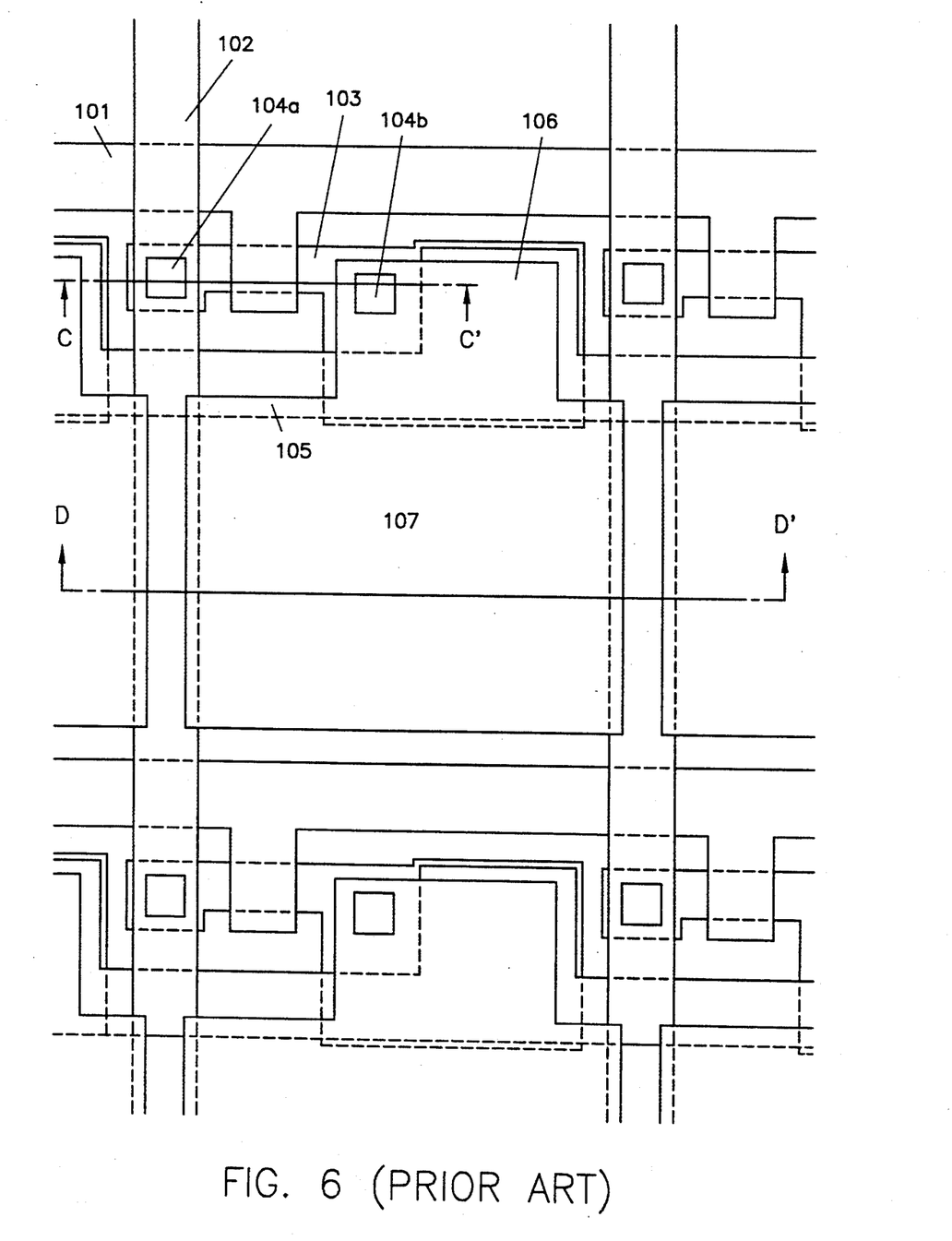
FIG. 6 is a plan view showing an active matrix substrate of a prior art.
Figure 7:
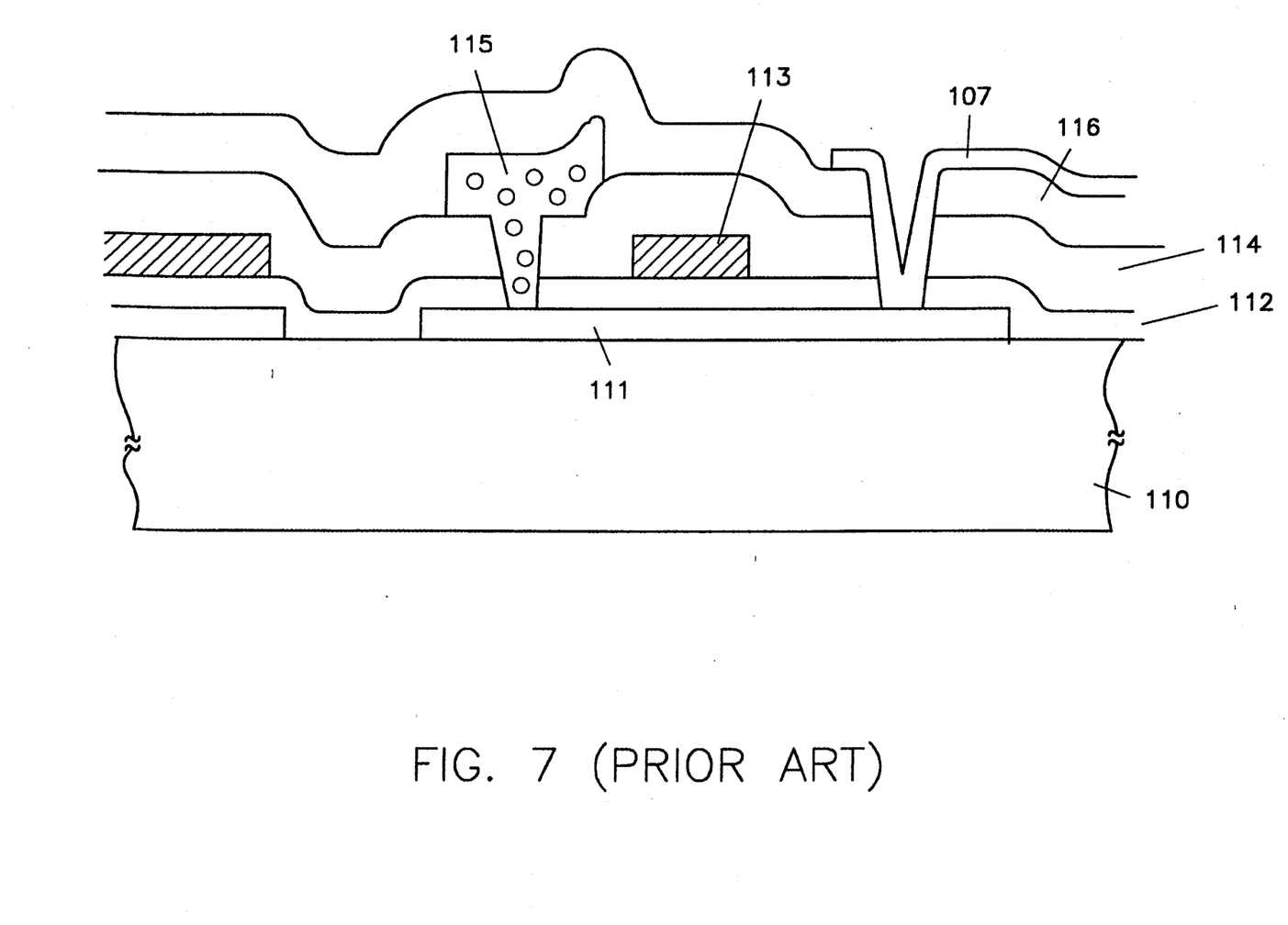
FIG. 7 is a cross-sectional view taken along a line C-C' in FIG. 6.

FIG. 6 is a plan view showing an exemplary construction of a conventional active matrix substrate. FIG. 7 is a cross-sectional view taken along a line C-C' in FIG. 6.

In the active matrix substrate, gate bus lines 101 and source bus lines 102 which cross the gate bus lines 101 are formed on a transparent insulating substrate 110. In each of regions defined by the gate and the source bus lines 101 and 102, a picture element electrode 107 is formed. To the picture element electrode 107, a video signal is supplied from the corresponding source bus line 102 via a thin film transistor (hereinafter, abbreviated as a TFT) 103 as a switching element.

Referring to FIG. 7, the TFT 103 includes a thin silicon film 111 formed on the transparent insulating substrate 110, a gate insulating film 112 formed on the thin silicon film 111, and a gate electrode 113 formed on the gate insulating film 112. The thin silicon film 111 serves as a source electrode, a drain electrode and a semiconductor layer of the TFT 103. The gate insulating film 112 is formed so as to cover the thin silicon film 111. Then, the gate electrode 113 is formed on the gate insulating film 112. Over a substantially entire surface of the transparent insulating substrate 110 on which the gate electrode 113 has been formed, an interlayer insulating film 114 is formed.

A contact hole 104a is formed through the interlayer insulating film 114 and the gate insulating film 112. On the interlayer insulating film 114, the source bus line 102 (115 in FIG. 7) of a low resistive metal such as Al is formed. The source bus line 102 is connected to the source electrode of the TFT 103 via the contact hole 104a.

On the interlayer insulating film 114, a second interlayer insulating film 116 is formed. A contact hole 104b is formed through the insulating films 112, 114 and 116.

The picture element electrode 107 formed on the second interlayer insulating film 116 is made of an ITO (indium tin oxide) film. As is shown in FIG. 7, the picture element electrode 107 is connected to the drain electrode of the TFT 103 via the contact hole 104b.

As is shown in FIG. 6, an additional capacitance common interconnection 105 is formed parallel to the gate bus line 101. In an overlapping area where the additional capacitance common interconnection 105 overlaps the thin silicon film 111, an additional capacitance 106 is formed. In the additional capacitance 106, the additional capacitance common interconnection 105 serves as an upper electrode and the thin silicon film 111 serves as a lower electrode.

In the active matrix substrate with the above construction, when the potential of the gate bus line 101 is HIGH and the TFT 103 is in an ON state, a video signal is written into the picture element electrode 107 and the additional capacitance 106. The written signal is held under such conditions that the potential of the gate bus line 101 is LOW and the TFT 103 is OFF. Since the additional capacitance 106 is connected to the picture element electrode 107 in parallel, the signal holding property can be enhanced.

Figure 8:
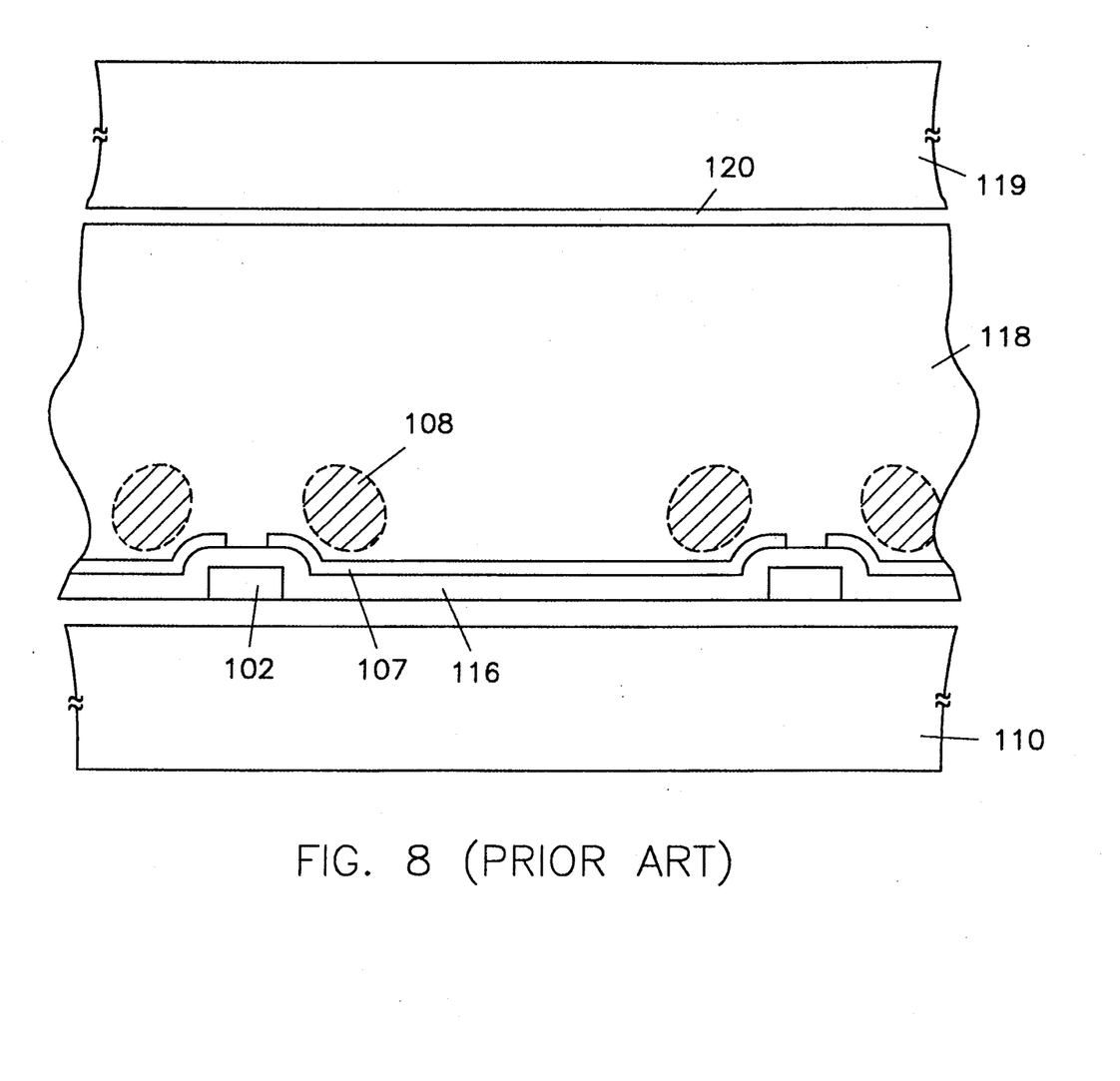
FIG. 8 is a cross-sectional view taken along a line D-D' in FIG. 6.

FIG. 8 is a cross-sectional view taken along a line D-D' in FIG. 6. As is shown in FIG. 8, in the prior art, the picture element electrode 107 overlaps the source bus line 102 for the following reasons.

In the case where there is any gap between the source bus line 102 and the picture element electrode 107, the gap portion does not contribute to a display. Moreover, it is necessary to provide a light blocking film on a counter substrate 119 for blocking light leaked from the gap. As a result, the opening ratio of the display apparatus is reduced by the gap and the light blocking film. In the case where the picture element electrode 107 overlaps the source bus line 102, the overlapping area does not contribute to a display, but an area which can contribute to the display can be maximum. In addition, in the overlapping portion of the picture element electrode 107, light is blocked by the source bus line 102, which means that light is not incident on the area which does not contribute to the display, so that a light blocking film for blocking leaked light therefrom is not required. As a result, the opening ratio of the liquid crystal display apparatus can be made larger, and the display apparatus can attain a brighter display.

In the conventional active matrix substrate having a structure in which the picture element electrode 107 is superposed on the source bus line 102, as is shown in FIG. 8, a step is made in the picture element electrode 107 because of the step of the interlayer insulating film 116 in the vicinity of the source bus line 102. As a result, the orientation of liquid crystal molecules is disordered in portions 108 of a liquid crystal layer 118 in the vicinity of the picture element electrode 107. The portion 108 is hatched in FIG. 8. The orientation disorder of liquid crystal molecules is increased due to an electric field around the bus line in addition to the geometrical factor of steps of the bus line.

The above-mentioned orientation disorder results in light leakage. Specifically, in a normally white mode display, there occurs a phenomenon that the vicinity of the step of the bus line is white even when a voltage is applied to the liquid crystal for a black display. As a result, the contrast ratio of the display apparatus is degraded, and hence the display quality is deteriorated.

SUMMARY OF THE INVENTION

The active matrix substrate of this invention includes: a plurality of scanning lines; a plurality of signal lines which cross the plurality of scanning lines; a plurality of picture element electrodes formed in regions defined by the plurality of scanning lines and the plurality of signal lines, respectively, part of each of the plurality of picture element electrodes overlapping at least one of the scanning lines and the signal lines adjacent to the picture element electrode; and a light blocking film covering the line.

In one embodiment of the invention, the light blocking film has a thickness smaller than that of the line.

In another embodiment of the invention, the active matrix substrate further includes an insulating film formed on the line, and the light blocking film is formed on the insulating film.

In another embodiment of the invention, the light blocking film is formed on the line.

In another embodiment of the invention, the light blocking film has a thickness of 100 nm or less.

In another embodiment of the invention, the light blocking film is formed in an area having a width larger than that of the line by a predetermined amount.

According to the invention, the leakage light caused by the orientation disorder of liquid crystal around the stepped portion of the interconnection where the picture element electrode overlaps the interconnection is blocked by the light blocking film. Moreover, since the light blocking film is thin, the step of the picture element electrode caused by the step of the light blocking film itself can be reduced. As a result, the orientation disorder of liquid crystal molecules is suppressed.

Thus, the invention described herein makes possible the advantage of providing an active matrix substrate in which light leakage due to orientation disorder of liquid crystal molecules is suppressed, so that the contrast ratio and the display quality are both good.

This and other advantages of the present invention will become apparent to those skilled in the art upon reading and understanding the following detailed description with reference to the accompanying figures.

DESCRIPTION OF THE PREFERRED EMBODIMENTS

Hereinafter, the invention will be described by way of examples.

EXAMPLE 1

Figure 1:
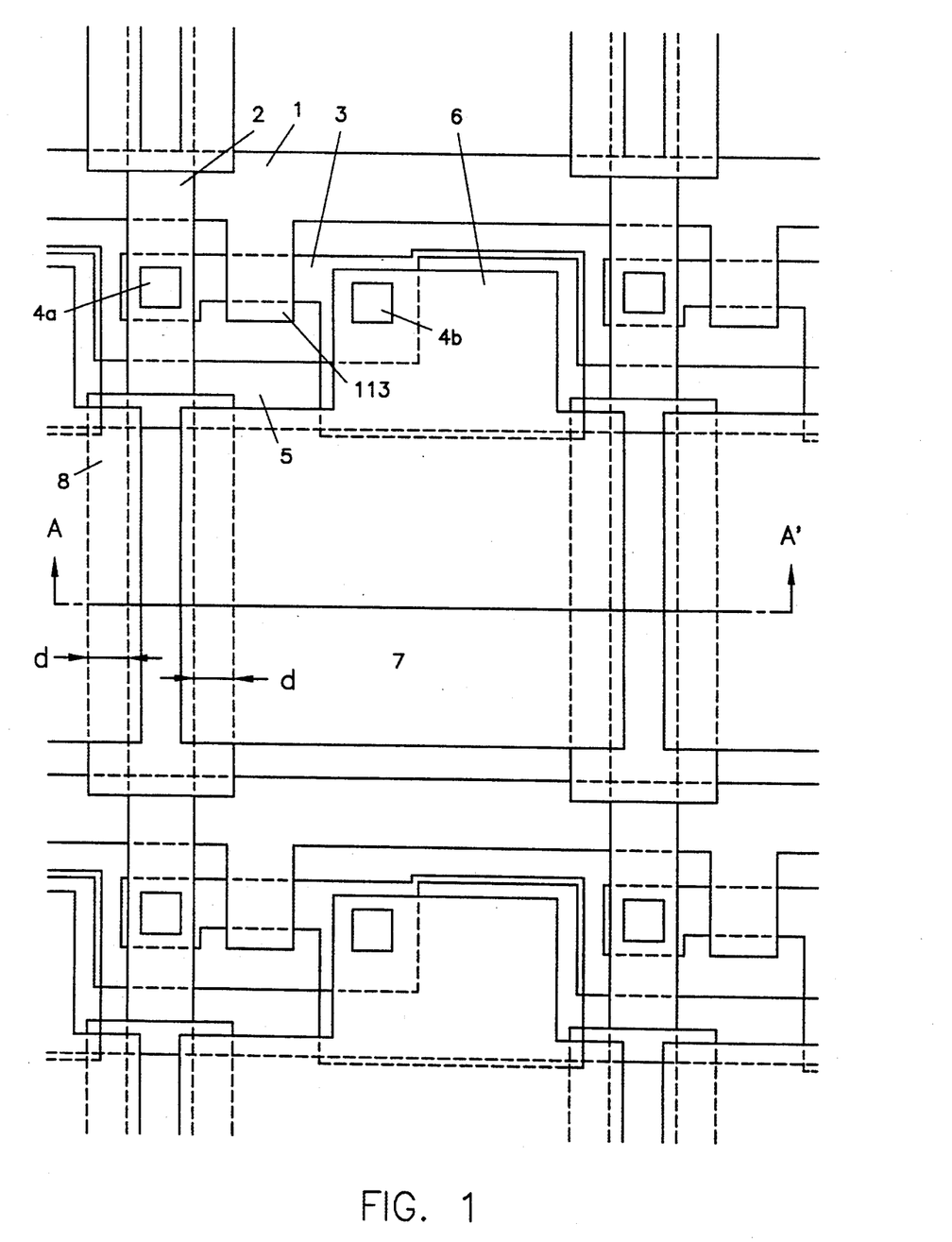
FIG. 1 is a plan view showing an active matrix substrate as a first example of the invention.
Figure 2:
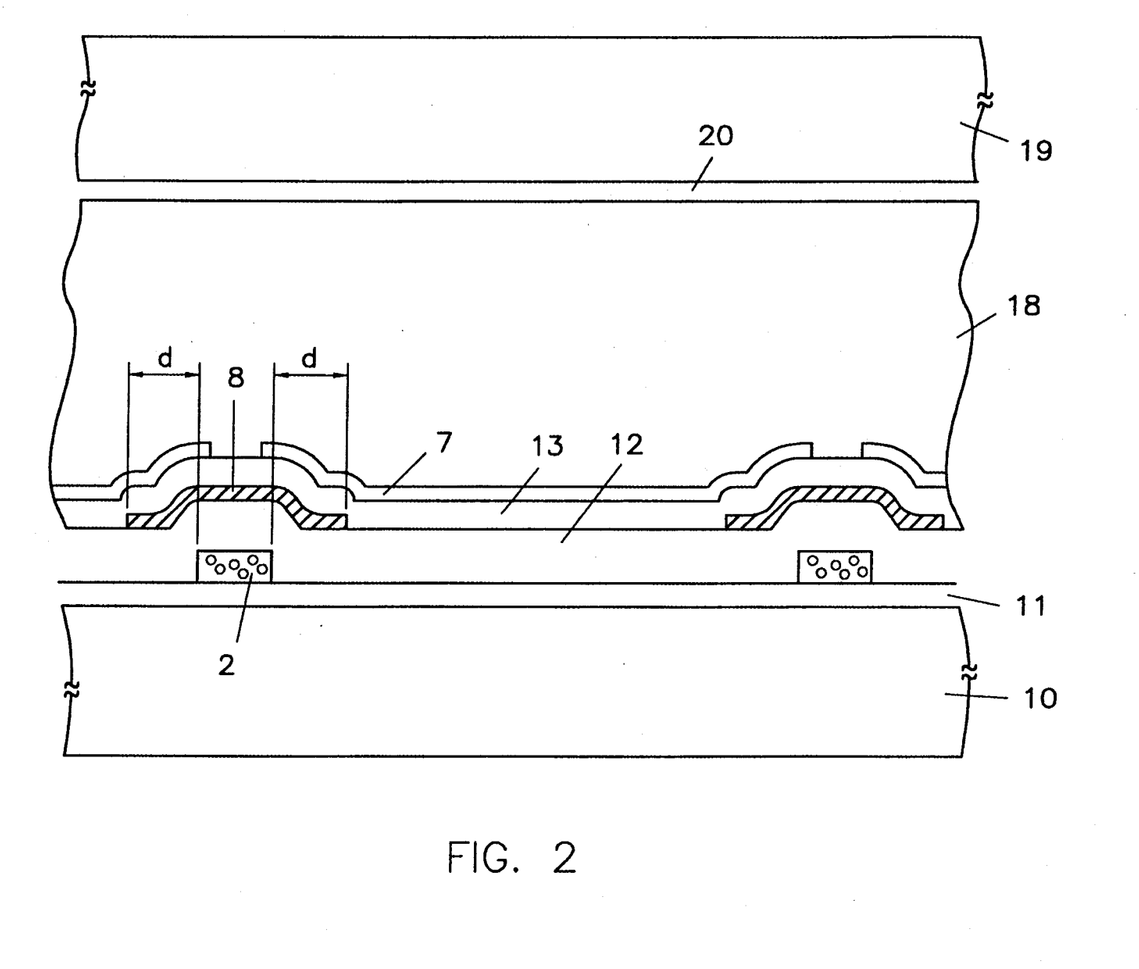
FIG. 2 is a cross-sectional view taken along a line A-A' in FIG. 1.

FIG. 1 is a plan view showing an exemplary construction of an active matrix substrate as a first example of the invention. FIG. 2 is a cross-sectional view taken along a line A-A' in FIG. 1.

In this active matrix substrate, gate bus lines 1 and source bus lines 2 which cross the gate bus lines 1 are formed on a transparent insulating substrate 10. In each of regions defined by the gate and the source bus lines 1 and 2, a picture element electrode 7 is formed in such a manner that the picture element electrode 7 partially overlaps the source bus line 2. To the picture element electrode 7, a video signal is supplied from the corresponding source bus line 2 via a thin film transistor (hereinafter, abbreviated as a TFT) 3 as a switching element.

The TFT 3 has the same construction as that shown in FIG. 7, and the explanation for the TFT 3 is omitted.

An interlayer insulating film 12 is formed on the source bus line 2. A light blocking film 8 is formed on the interlayer insulating film 12 so as to cover the source bus line 2.

Another interlayer insulating film 13 is formed on the interlayer insulating film 12 on which the light blocking film 8 has been formed. On the interlayer insulating film 13, the picture element electrode 7 made of an ITO film is formed.

Next, a fabrication method of the active matrix substrate having the above-described construction is described with reference to FIG. 2.

The fabrication processes are the same as those in the prior art example before the formation of the source bus line 2.

In this example, the source bus line 2 is formed of Al to have a thickness of 500 nanometers (nm). On the source bus line 2, the interlayer insulating film 12 is formed of a silicon oxide film having a thickness of 400 nm. Then, a metal film which will function as the light blocking film 8 is formed by sputtering. The metal film is patterned to form the light blocking film 8. For the light blocking film 8, Al is used. The light blocking film 8 has a thickness of 100 nm. Each of lengths d of the side excess portions of the light blocking film 8 over the source bus line 2 in the transverse direction is set to be about 5 $\mu$m. Then, on the light blocking film 8, the interlayer insulating film 13 and the picture element electrode 7 are formed.

An orientation process is performed for the thus fabricated active matrix substrate. Then, a counter substrate 19 having a counter electrode 20 of a transparent conductive film formed on the surface thereof is attached to the active matrix substrate. Into a space between the substrates, liquid crystal is injected to form the liquid crystal layer 18. Thus, a liquid crystal display apparatus as shown in FIG. 2 is constructed. The thickness of the liquid crystal layer 18 is set to be about 5 $\mu$m.

In this example, the light blocking film 8 has a width larger than that of the source bus line 2, and is formed so as to cover the source bus line 2. Therefore, the leakage light due to the orientation disorder of liquid crystal molecules by the step of the source bus line 2 is blocked. Moreover, since the light blocking film 8 is thin, the step of the picture element electrode 7 which is caused by the step of the source bus line 2 cannot be largely increased by the light blocking film 8. For example, when the source bus line 2 has a thickness of 500 nm, and the light blocking film 8 has a thickness of 100 nm or less, the step of the light blocking film 8 itself is small. As a result, the orientation disorder of liquid crystal molecules due to the step of the light blocking film 8 can be reduced. Therefore, light leakage can be suppressed, so that the contrast ratio can be improved. As a result, a display apparatus having superior display characteristics which can perform a brighter display can be provided. The excess length d of about 5 $\mu$m is determined by considering the overlapping registration of the picture element electrode 7 with respect to the source bus line 2 and the width of the region where the orientation of liquid crystal molecules is disordered. However, if the excess length d is too large, the opening ratio is decreased. For this reason, the excess length d is preferably set to be 5 $\mu$m or less.

EXAMPLE 2

Figure 3:
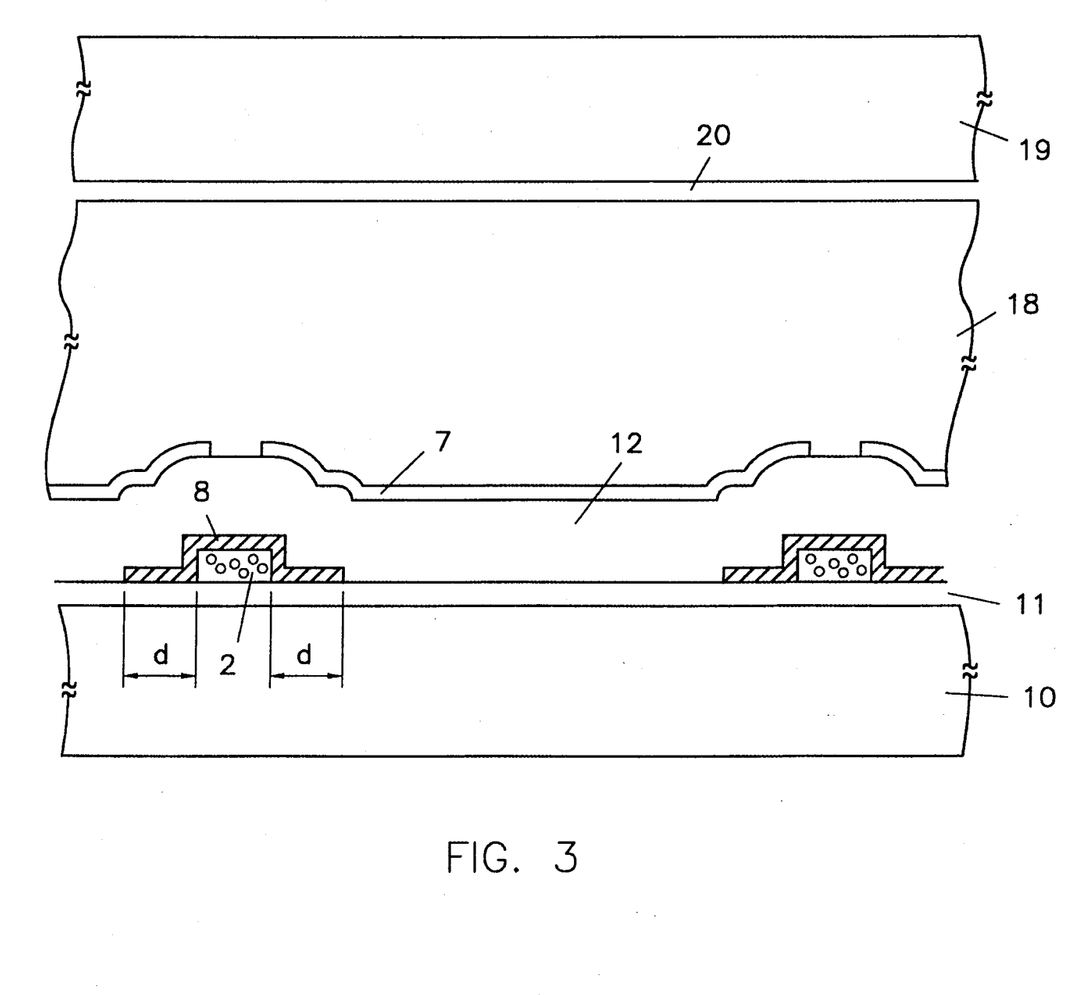
FIG. 3 is a cross-sectional view of an active matrix substrate as a second example of the invention taken along a line A-A' in FIG. 1.

FIG. 3 is a cross-sectional view of an active matrix substrate as a second example of the invention taken along a line A-A' in FIG. 1.

In the active matrix substrate of the second example, a light blocking film 8 is formed directly on a source bus line 2. In other words, the interlayer insulating film 13 which is formed in the first example (see FIG. 2) is not formed. The light blocking film 8 is made of Al and has a thickness of 100 nm. Each of the excess lengths d on both the side portions of the light blocking film 8 is set to be 5 µm or less. Moreover, the light blocking film 8 is formed so as to cover the source bus line 2 in an area where the picture element electrode 7 overlaps the source bus line 2.

As a result, the portion where the light blocking film 8 (thickness: 100 nm) is formed on the source bus line 2 (thickness: 400 nm) has the total thickness of 500 nm is section. Thereon, an interlayer insulating film 12 is formed. On the interlayer insulating film 12, the picture element electrode 7 is formed.

Also in the second example, the leaked light due to the orientation disorder caused by the step of the source bus line 2 can be blocked by the light blocking film 8.

The light blocking film 8 is formed to be sufficiently thin (100 nm) with respect to the thickness of the source bus line 2 (400 nm). Therefore, the orientation disorder due to the step of the light blocking film 8 can be reduced as in the first example.

Furthermore, it is unnecessary to provide an interlayer insulating film between the source bus line 2 and the light blocking film 8, so that the productivity can be improved as compared with the first example.

EXAMPLE 3

Figure 4:
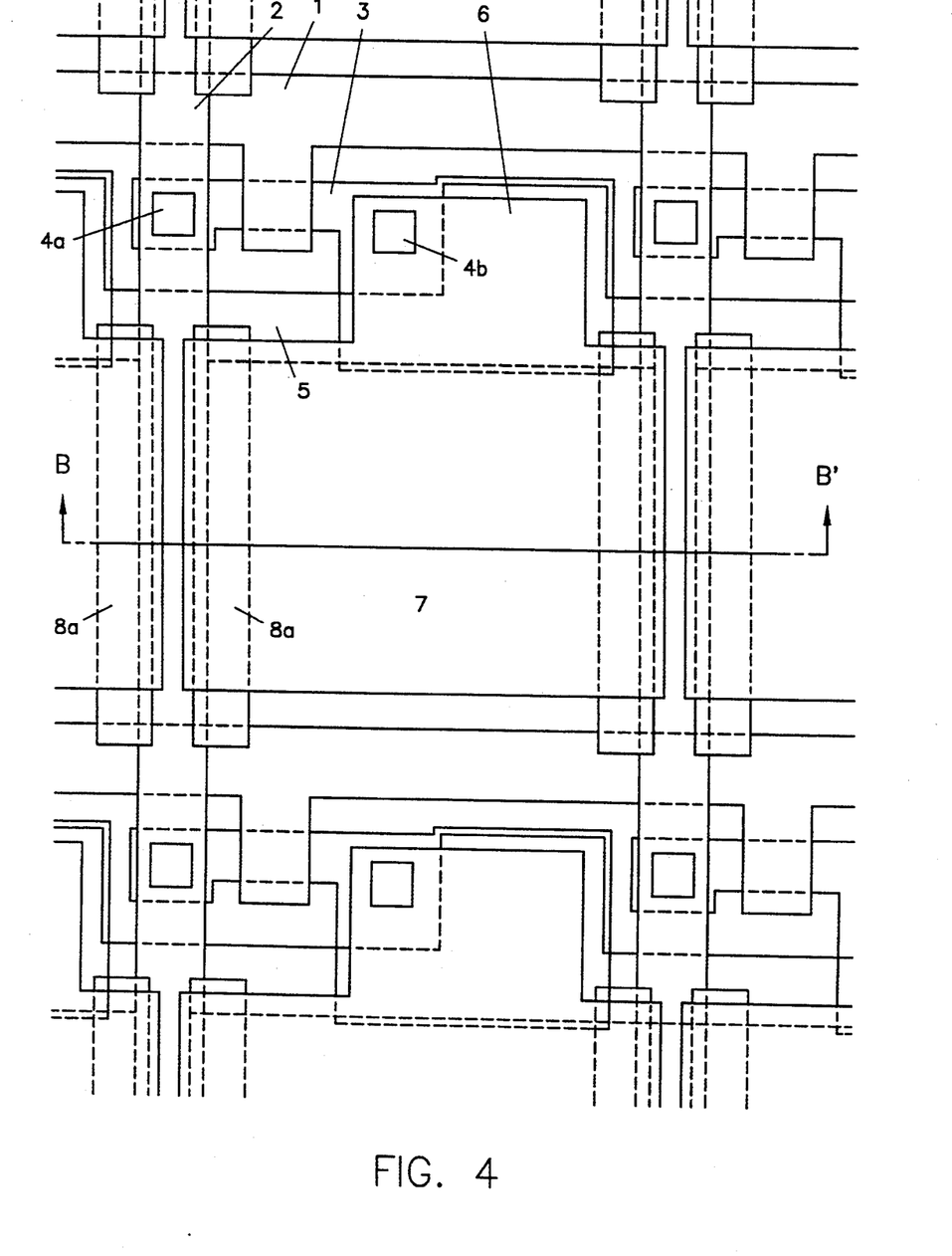
FIG. 4 is a plan view showing an active matrix substrate as a third example of the invention.
Figure 5:
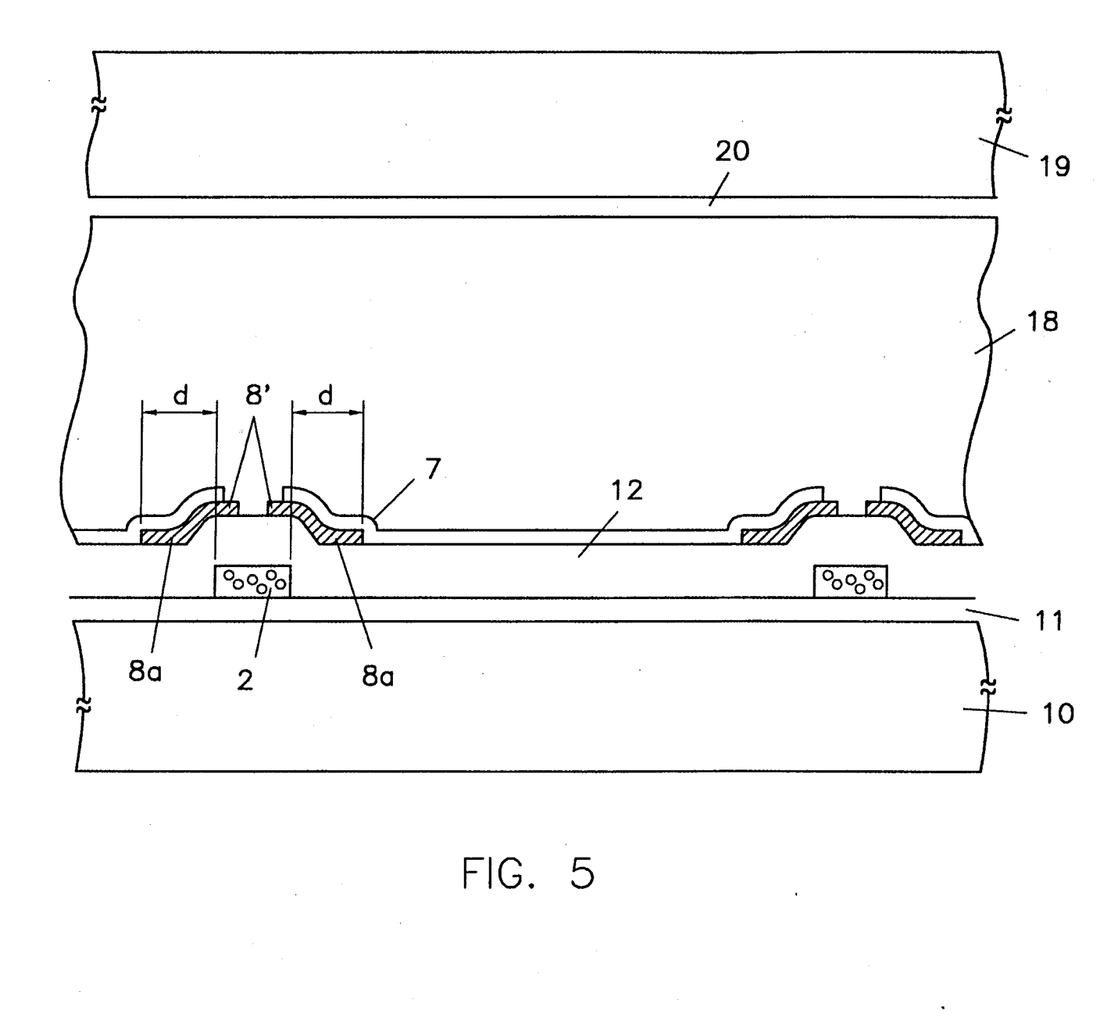
FIG. 5 is a cross-sectional view taken along a line B-B' in FIG. 4.

FIG. 4 is a plan view showing an active matrix substrate as a third example of the invention. FIG. 5 is a cross-sectional view taken along a line B-B' in FIG. 4.

In this example, an interlayer insulating film 12 is formed so as to cover a source bus line 2. The interlayer insulating film 12 is made of a silicon oxide film and has a thickness of 400 nm. The source bus line 2 is made of Al and has a thickness of 500 nm. A light blocking film 8' is formed so as to be in contact with a picture element electrode 7 in such a manner that the light blocking film 8' covers the stepped portion of the interlayer insulating film 12 caused by the source bus line 2. The light blocking film 8' is made of an alloy of Ti and W and has a thickness of 100 nm. Each of the excess lengths d of the light blocking film 8' is set to be 5 µm or less. The light blocking film 8' is separated into left and right light blocking films 8a. Such a separation prevents the picture element electrodes 7 which are adjacent to each other from being conductive via the light blocking film 8'. The alloy of Ti and W is used as the material of the light blocking film 8' so that the light blocking film 8 will not be damaged during the patterning for forming the picture element electrode 7 of ITO. Also in this third example, the light blocking film 8' is sufficiently thin (100 nm) as compared with the thickness of the source bus line 2 (500 nm). Therefore, the orientation disorder of liquid crystal molecules due to the step of the light blocking film 8' can be reduced as in the above two examples. Also, it is unnecessary to provide an interlayer insulating film between the light blocking film 8' and the picture element electrode 7, so that the productivity can be improved.

In the above examples, the light blocking film is made of Al or an alloy of Ti and W. However, the material is not limited to Al or the alloy of Ti and W. Any other material can be used if the material with a thickness of 100 nm or less has a sufficiently low transmittance for light in the visible radiation range.

In the above examples, the case where the light blocking film covers the source bus line has been described. However, the present invention is not limited to this case. Alternatively, it is appreciated that a light blocking film may be formed on a gate bus line, or formed on both the source and the gate bus lines.

As described above, any leaked light due to orientation disorder of liquid crystal molecules caused by the stepped portion of the side face of the bus line can be blocked by the provision of the light blocking film around the stepped portion. Therefore, the contrast ratio can be improved, and the display characteristics can also be improved.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

We claim:

1. An active matrix substrate comprising:
   a plurality of scanning lines;
   a plurality of signal lines which cross said plurality of scanning lines;
   a plurality of picture element electrodes formed in regions defined by said plurality of scanning lines and said plurality of signal lines, respectively, part of each of said plurality of picture element electrodes overlapping at least one of said scanning lines and said signal lines adjacent to said picture element electrode to form a step portion in each of said picture element electrodes; and
   a light blocking film covering said at least one line, said light blocking film having a thickness smaller than that of said at least one line, said light blocking film having a width larger than that of said at least one line a predetermined amount, said predetermined amount being determined so that said light blocking film covers said step portion of said each of said picture element electrodes.

2. An active matrix substrate according to claim 1, wherein said predetermined amount is 5 µm or less.

3. An active matrix substrate according to claim 1, wherein said light blocking film is formed on said at least one line.

4. An active matrix substrate according to claim 3, wherein said light blocking film has a thickness of 100 nm or less.

5. An active matrix substrate according to claim 1, wherein said light blocking film is formed in an area having a width larger than that of said at least one line by a predetermined amount.

6. An active matrix substrate according to claim 1, wherein said light blocking film has a thickness of 100 nm or less.

7. An active matrix substrate according to claim 1, wherein said active matrix substrate further comprises an insulating film formed on said at least one line, said light blocking film being formed on said insulating film.

8. An active matrix substrate according to claim 7, wherein said light blocking film has a thickness of 100 nm or less.

9. An active matrix substrate according to claim 7, wherein said light blocking layer is divided into two light blocking portions which are spaced from each other.

10. An active matrix substrate according to claim 9, wherein said each of said picture element electrodes is formed on said light blocking film directly.

11. An active matrix substrate according to claim 7, wherein said each of said picture element electrodes is insulated from said light blocking layer.

12. A liquid crystal display apparatus including a pair of substrates and a liquid crystal layer sandwiched between the substrates, one of the pair comprising:
- a plurality of scanning lines;
- a plurality of signal which cross the scanning lines;
- a plurality of picture element electrodes formed in regions defined by the plurality of scanning lines and the plurality of signal lines, respectively, each of the plurality of picture element electrodes partially overlapping at least one of the scanning lines and the signal lines adjacent to the picture element electrode to form a step portion in each of the picture element electrodes; and
- a light blocking film covering the at least one line, a thickness of the light blocking film being smaller than that of the at least one line, the light blocking film having excess portions which do not overlap the at least one line,
- wherein the excess portions of the light blocking film block light leaked from regions in the vicinity of the step portion in the liquid crystal layer.

13. A liquid crystal display apparatus according to claim 12, wherein a width of each of the excess portions is 5 $\mu$m or less.

* * * * *

UNITED STATES PATENT AND TRADEMARK OFFICE
CERTIFICATE OF CORRECTION

PATENT NO. : 5,426,523
DATED : June 20, 1995
INVENTOR(S) : Takayuki Shimada, et. al.

It is certified that error appears in the above-indentified patent and that said Letters Patent is hereby corrected as shown below:

Column 6, line 36, after "line" insert --by--.

Signed and Sealed this

Twenty-fourth Day of October, 1995

Attest:

BRUCE LEHMAN

*Attesting Officer*  *Commissioner of Patents and Trademarks*